United States Patent [19]
Reilly, Jr. et al.

[11] 3,711,601
[45] Jan. 16, 1973

[54] ENRICHING WITH HEAVY HYDROGEN ISOTOPES

[75] Inventors: James J. Reilly, Jr., Bellport, N.Y. 11713; Richard H. Wiswall, Jr., Brookhaven, N.Y. 11719

[73] Assignee: The United States of America as represented by the United States Atomic Energy Commission

[22] Filed: Feb. 12, 1971

[21] Appl. No.: 115,139

[52] U.S. Cl. ................................423/648, 423/645
[51] Int. Cl. .................................................C01b 4/14
[58] Field of Search ....................23/360, 210 I, 204

[56] References Cited

OTHER PUBLICATIONS

Chemical Abstracts; Vol. 69, 1968 No. 62383k.

Primary Examiner—Oscar R. Vertiz
Assistant Examiner—G. Alvaro
Attorney—Roland A. Anderson

[57] ABSTRACT

A method of recovering deuterium and tritium from hydrogen comprising exposing vanadium hydride to gaseous mixtures containing the heavy isotopes of hydrogen and allowing the heavy isotopes to undergo mass transference with the hydrogen of the vanadium hydride until the ratio of heavy hydrogen isotope atoms to hydrogen atoms in the vanadium hydride is greater than the ratio in the gas.

3 Claims, No Drawings ically at a concentration of 0.0156 mole percent (one part in 6410), interest concerns the manufacture of heavy water which is used as a moderator in certain types of nuclear reactors. In the case of tritium, which is radioactive, concern is for its presence in the hydrogen component of effluents from nuclear reactors and fuel reprocessing plants. Here, the interest is in removing the tritium component prior to the release of hydrogen.

ENRICHING WITH HEAVY HYDROGEN ISOTOPES

SOURCE OF THE INVENTION

The invention described herein was made in the course of, or under a contract with the U. S. Atomic Energy Commission.

BACKGROUND OF THE INVENTION

The deuterium (D) and tritium (T) isotopes of hydrogen, for somewhat different reasons, are of great interest to workers in the field of nuclear energy. In the case of deuterium, which appears in hydrogen normally at a concentration of 0.0156 mole percent (one part in 6410), interest concerns the manufacture of heavy water which is used as a moderator in certain types of nuclear reactors. In the case of tritium, which is radioactive, concern is for its presence in the hydrogen component of effluents from nuclear reactors and fuel reprocessing plants. Here, the interest is in removing the tritium component prior to the release of hydrogen.

By the term hydrogen is meant any mixture of some or all of the isotopes having an atomic number of one. Deuterium and tritium are referred to as the heavy isotopes of hydrogen. The chemical symbols have their conventional meanings.

Separation of deuterium and/or tritium can be accomplished in a variety of ways. The use of hydrides have been considered more than once before, since it has long been known that for many metals there are slight differences among the stabilities of the hydride, deuteride and tritide. An example is U. S. Pat. No. 3,081,156 which covers the use of sodium hydride and deuteride.

However, in every system which has been described up until now, it was always the lighter hydrogen isotope which had the lower dissociation pressure. That is, if a metal hydride were equilibrated with a mixture of hydrogen and deuterium, it was always in the gas phase that the deuterium became enriched, relative to its ratio to hydrogen in the solid phase. This state of affairs did not favor the use of such systems in processes designed to remove small quantities of heavy isotope, whether deuterium or tritium, from large quantities of normal hydrogen. One would much prefer a solid which selectively absorbed the minor species and left the bulk of hydrogen unreacted.

SUMMARY OF THE PRESENT INVENTION

The present invention provides a way of recovering deuterium and tritium from hydrogen in which the enrichment of the heavy hydrogen isotopes occurs in a solid.

In accordance with a preferred embodiment of this invention, the solid whose composition lies within the range V–VH$_2$, but preferably is VH$_2$ (vanadium dihydride), is subject to exchange of hydrogen in the gas phase containing deuterium or tritium. Under the correct set of conditions, isotopic exchange takes place, and it has been found that the direction of this exchange is such that the ratio R$_s$ of heavy isotope (i.e., deuterium or tritium) to light isotope in the solid phase is greater than the corresponding ratio Rg in the gas when equilibrium is reached. Subsequent desorption removes from the solid the hydrogen enriched with the heavier isotope.

A measure of this enrichment process is given by a separation factor (S.F.) which is defined as the ratio Rs/Rg. Experiments carried out show that the V–VH$_2$ separation factors lie in the following ranges:
S.F. for hydrogen-deuterium = 1.5 – 1.8
S.F. for hydrogen-tritium = 1.6 – 1.9

In an actual separation process, these figures represent the enrichment or depletion which can be obtained in a single stage. By using a series of stages in succession, overall enrichment or depletion can be increased to any desired level.

A single stage can consist of the absorption of the hydrogen including deuterium or tritium by vanadium followed by the separation of the gas and solid phases (e.g., removal of the gas phase), and then desorption of part or all of the gas in the solid phase. As an alternative, the stage can consist in allowing the hydrogen-deuterium or tritium mixture to undergo isotopic exchange with the hydrogen in VH$_2$ without an appreciable interphase transfer of mass occurring, followed by the separation and desorption noted above. Or, as may be closer to the practical situation, the solid can be V–VH–VH$_2$ in which a combination of both of the above described absorption processes take place.

It should also be noted that the degree of separation can be increased by providing a series of stages, such as in a multi-stage countercurrent operation.

It is thus a principal object of this invention to recover deuterium or tritium from hydrogen by concentrating the heavy hydrogen isotope in the solid phase.

Other objects and advantages of this invention will become obvious from the following description of the preferred embodiments of this invention.

DESCRIPTION OF THE PREFERRED EMBODIMENTS

The vanadium or the hydrided solid used to carry out the principles of this invention may be powdered for best results and evacuated of any residual gases. As described briefly in the examples, the VH$_2$ may be prepared by reacting commercial grade vanadium metal with hydrogen gas in a high-pressure reactor.

The VH$_2$, VH, V, or mixtures thereof is then exposed to hydrogen containing deuterium or tritium under a pressure which is higher than the dissociation pressure of VH$_2$ at any temperature where absorption is taking place. This temperature is found not to be critical but should be in the range of −50° to 110°C because of certain practical considerations. At temperatures less than −50°C the kinetics are such that the process slows down to a low rate. As the higher end of the temperature range is reached, the reaction occurs at a greater rate but the S.F. declines to a level which makes the process relatively unproductive. Because the S.F. increases as the temperature at which the absorption process is conducted is lowered, it is seen that it may be expedient to carry out the absorption step at near ambient temperature.

After equilibrium conditions are reached as evidenced by measuring samples of the gas phase until an unchanging composition is reached, the gas phase is evacuated from the chamber containing the VH$_2$ enriched with the heavier isotope. The solid is then heated to a temperature sufficient to cause its decomposition and the evolving gases are collected. The evolved gas is richer in the D or T than the gas composition of the starting feed gas to the extent indicated by the appropriate separation factor.

The following examples illustrate this invention:

EXAMPLE I

Vanadium dihydride was prepared by reacting commercial grade vanadium metal granules passed through a quarter inch mesh with hydrogen gas in a high-pressure reactor. When the composition of the solid approached $VH_2$ as evidenced by stabilization of the pressure in the hydrogen supply the reactor was cooled to $-196°C$ and the residual gas evacuated. In practice it would not be necessary to cool the reactor to $-196°C$; here it was done in order to simplify the measurement of the separation factor by first removing essentially all the gas from the system, without decomposing the $VH_2$, before introducing the deuterium containing gas mixture.

A gas mixture, consisting of 48 percent by volume of deuterium in hydrogen, was charged to the reactor until the pressure was 227 psia. The temperature of the reactor and its contents were raised to 28°C, the indicated pressure rising to 526 psia. The gas phase was then sampled periodically while maintaining the temperature constant at 28°C. A mass spectrometer was used to measure the deuterium content of each sample with the following results:

| Sample No. | Elapsed Time Hours | Deuterium Concentration in Sample Volume Percent |
|---|---|---|
| 1 | 0 | 53.3 |
| 2 | 3.5 | 31.0 |
| 3 | 19.5 | 12.0 |
| 4 | 43.5 | 5.6 |
| 5 | 67.5 | 4.6 |
| 6 | 74 | 4.4 |

After 74 hours, the reactor was vented to reduce the gas pressure to 100 psia. The solid (now a mixture of $VH_2$, VHD and $VD_2$) was decomposed by heating to 450°C while collecting the evolved gases. Analysis of the gas evolved during heating was 6.7% $D_2$ and 93.3% $H_2$, by volume. The amount of D as gm. atoms of D in the solid phase at the end of the experiment was $9.78 \times 10^{-3}$ while the amount of hydrogen, as gm. atoms, was $135.32 \times 10^{-3}$. The corresponding amounts of D and H in the gas phase were $0.56 \times 10^{-3}$ and $12.06 \times 10^{-3}$. Thus, the separation factor is as follows:

$$S.F. = [9.78 \times 10^{-3}/135.32 \times 10^{-3}]/[0.56 \times 10^{-3}/12.06 \times 10^{-3}] = 1.56$$

showing an enrichment of deuterium in the solid phase.

The significance of these results lies in the fact that the ratio of the heavier isotope to hydrogen in the solid is greater than the corresponding ratio in the gas at equilibrium.

EXAMPLE II

A similar experiment was conducted in which the gas contacting the $VH_2$ was a hydrogen-tritium mixture. At an experimental temperature of 28°C the separation factor was found to be 1.88.

As previously noted, a particular advantage of this invention resides in the fact that the heavy hydrogen isotope is concentrated in the solid phase. A further advantage of the process is that the exchange reaction may take place at ambient temperature. Such a combination results in a simple and economic separation process.

While the process has been described using vanadium alone, under some circumstances it may be desirable to use a vanadium alloy in which another metal is present to shift operating conditions to more convenient or economic ranges. One example of a suitable alloy is vanadium with some niobium present. Also, the process as described may be useful for the separation of deuterium and tritium.

What is claimed is:

1. The process of enriching a hydrogen atmosphere with at least one heavy hydrogen isotope comprising the steps of contacting hydrided vanadium with a hydrogen containing atmosphere containing at least one heavy isotope of hydrogen at a temperature in the range of $-50°$ to $110°C$ and at a pressure above the dissociation pressure of the hydrided vanadium until the ratio of the heavy hydrogen isotope to the light isotope of hydrogen in the hydrided vanadium is greater than the same ratio in the contacting atmosphere, thereafter removing the hydrogen containing atmosphere, and then heating the enriched hydrided vanadium to a temperature sufficient to cause decomposition thereof and recovering the hydrogen enriched with the heavy isotope.

2. The process of claim 1 in which the contacting continues until equilibrium is reached.

3. The process of enriching a solid whose composition lies within the range $V-VH_2$ with at least one heavy hydrogen isotope comprising the step of exposing said solid to a gas containing hydrogen and at least one of its heavy isotopes at a temperature in the range of $-50°C$ to $110°C$ and a pressure above the dissociation pressure of the hydrided V until the ratio of the heavy hydrogen isotope to the light isotope in the hydrided V is greater than the same ratio in the contacting gas, thereafter removing said gas leaving the solid enriched with said heavy hydrogen isotope.

* * * * *